US012605815B1

(12) United States Patent
Bisoyi et al.

(10) Patent No.: US 12,605,815 B1
(45) Date of Patent: Apr. 21, 2026

(54) DISCHARGE VALVE REMOVAL AND INSTALLATION TOOL

(71) Applicant: KUWAIT NATIONAL PETROLEUM COMPANY, Safat (KW)

(72) Inventors: Bibekananda Bisoyi, Kuwait City (KW); Abdulaziz H.E.A.E. Altamimi, Kuwait City (KW)

(73) Assignee: KUWAIT NATIONAL PETROLEUM COMPANY, Safat (KW)

( * ) Notice: Subject to any disclaimer, the term of this patent is extended or adjusted under 35 U.S.C. 154(b) by 0 days.

(21) Appl. No.: 19/192,718

(22) Filed: Apr. 29, 2025

(51) Int. Cl.
*B25B 27/24* (2006.01)
*B25B 27/02* (2006.01)
*B25B 27/06* (2006.01)

(52) U.S. Cl.
CPC ............ *B25B 27/24* (2013.01); *B25B 27/023* (2013.01); *B25B 27/062* (2013.01)

(58) Field of Classification Search
CPC ...... B25B 27/24; B25B 27/023; B25B 27/062
See application file for complete search history.

(56) References Cited

U.S. PATENT DOCUMENTS 1,493,534 A 5/1924 Hardin
1,650,024 A 11/1927 Maxwell
2,650,419 A 9/1953 Barbisch
3,579,796 A * 5/1971 Fillion .................. B25B 27/023 29/259
3,846,891 A * 11/1974 Elg ....................... B25B 27/062 D8/51
4,471,517 A 9/1984 Denmeade et al.
4,771,528 A 9/1988 Stromberg
4,908,925 A * 3/1990 Johnson ................ B25B 27/023 29/244
4,965,921 A * 10/1990 Priest ...................... B25B 27/02 29/244
4,989,311 A * 2/1991 Rosin .................... B25B 27/023 29/259
6,212,775 B1 4/2001 Sarver et al.
8,132,331 B1 * 3/2012 Rutherford ........... B25B 27/062 29/257
8,186,031 B2 5/2012 Whitney et al.
8,464,411 B2 * 6/2013 Betcher ................... B66F 19/00 29/259
8,739,377 B2 6/2014 Shen
9,808,922 B2 11/2017 Breschi et al.
11,105,342 B2 * 8/2021 Williamson .......... F04D 29/563
11,118,484 B2 * 9/2021 Badellino ............... F01L 1/024
2005/0076486 A1 * 4/2005 Alanis ..................... B25B 27/24 29/217
2005/0086781 A1 * 4/2005 Thomson ................ F16C 43/00 29/251

(Continued)

*Primary Examiner* — Seahee Hong
(74) *Attorney, Agent, or Firm* — Nath, Goldberg & Meyer; Joshua B. Goldberg

(57) ABSTRACT

A valve assembly tool is provided including a beam having a shelf portion protruding from a central portion of the beam, and first and second handles extending from opposing ends of the beam. In an embodiment, the shelf portion includes a central hole defined therethrough and the tool stud extends through the central hole. In an embodiment, the tool stud includes an elongate threaded member having a locking nut at one end thereof.

17 Claims, 4 Drawing Sheets

(56) References Cited

U.S. PATENT DOCUMENTS

| | | | | |
|---|---|---|---|---|
| 2011/0035923 | A1* | 2/2011 | Jill | B25B 27/24 29/426.6 |
| 2011/0179616 | A1* | 7/2011 | Oachs | B25B 27/023 29/259 |
| 2016/0001429 | A1 | 1/2016 | Campoli | |
| 2017/0014981 | A1* | 1/2017 | Wallman | B25B 27/064 |

* cited by examiner

DISCHARGE VALVE REMOVAL AND INSTALLATION TOOL

BACKGROUND

1. Field

The disclosure of the present patent application relates to tools for handling valves in a machine and, particularly, to a device for removing or installing a discharge valve and cage assembly of a reciprocating compressor.

2. Description of the Related Art

Automatic valves are commonly used in a variety of machines, in particular reciprocating compressors. A reciprocating compressor usually comprises a casing with a cylinder formed therein, inside which a piston is slidingly and reciprocatingly movable under the control of a crank and connecting rod arrangement. The cylinder is in fluid communication with a fluid inlet and a fluid outlet. Automatic control valves are arranged in both a suction duct and a discharge duct leading to the fluid inlet and the fluid outlet respectively. These valves are usually mounted, along with a cage, in respective seats provided in the casing of the machine.

Thus, a valve assembly tool solving the aforementioned problems are desired.

SUMMARY

In certain embodiments, the present subject matter relates to a valve assembly tool including a beam and a tool stud removably extending through the beam. In an embodiment, the valve assembly tool can be used to install a discharge valve in the casing of a reciprocating compressor. In an embodiment, the valve can be vertically positioned in the casing. In an embodiment the valve assembly tool can be used to remove a discharge valve from the casing of a reciprocating compressor. In an embodiment, the valve can be a bottom-loaded valve.

According to an embodiment, the valve assembly tool includes a beam having a shelf portion protruding from a central portion of the beam, and first and second handles extending from opposing ends of the beam. In an embodiment, the shelf portion includes a central hole defined therethrough and the tool stud extends through the central hole. In an embodiment, the tool stud includes an elongate threaded member having a locking nut at one end thereof.

According to an embodiment, the valve assembly tool includes a beam having a shelf portion protruding from a central portion of the beam and first and second handles extending from opposing ends of the beam. In an embodiment, the shelf portion includes a central hole extending therethrough and a tool stud extending through the central hole. The tool stud can include an elongate threaded member having a locking nut at one end thereof and first and second holding nuts spaced from the locking nut.

According to an embodiment, a valve assembly tool can include a beam including a shelf portion protruding from a central portion of the beam and first and second handles extending from opposing ends of the beam. The shelf portion can include a first upright member, a second upright member, a connecting member extending between and connecting the first upright member and the second upright member, and a central hole extending through the connecting member. The tool stud can extend through the central hole. The tool stud can include an elongate threaded member having a locking nut at one end thereof and first and second holding nuts spaced from the locking nut.

In an embodiment, the first and second handles can be perpendicular to the ends of the beam.

These and other features of the present subject matter will become readily apparent upon further review of the following specification.

DETAILED DESCRIPTION OF THE PREFERRED EMBODIMENTS

Figure 1:
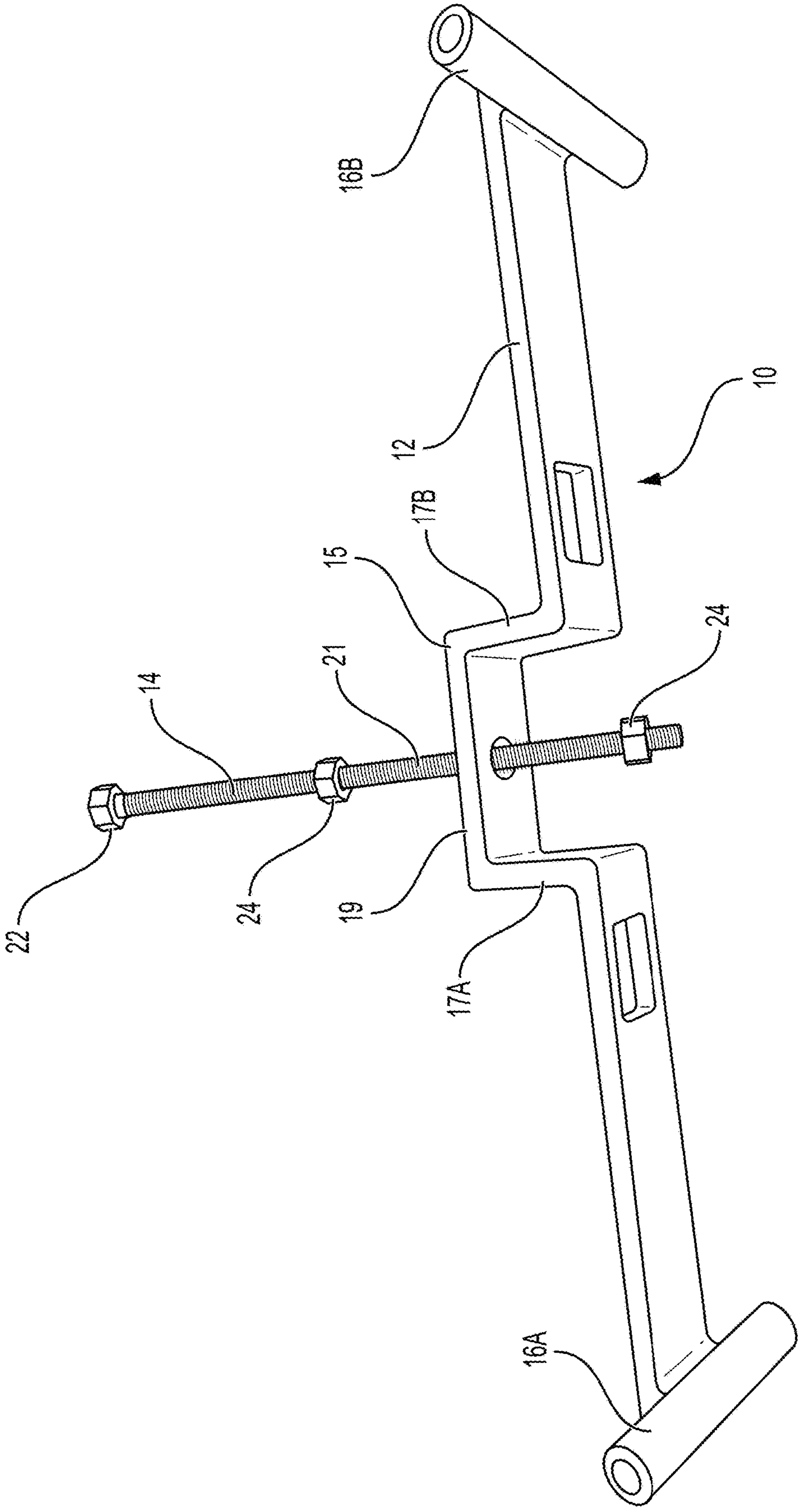
FIG. 1 is a perspective view of the discharge valve removal and installation tool.
Figure 2:
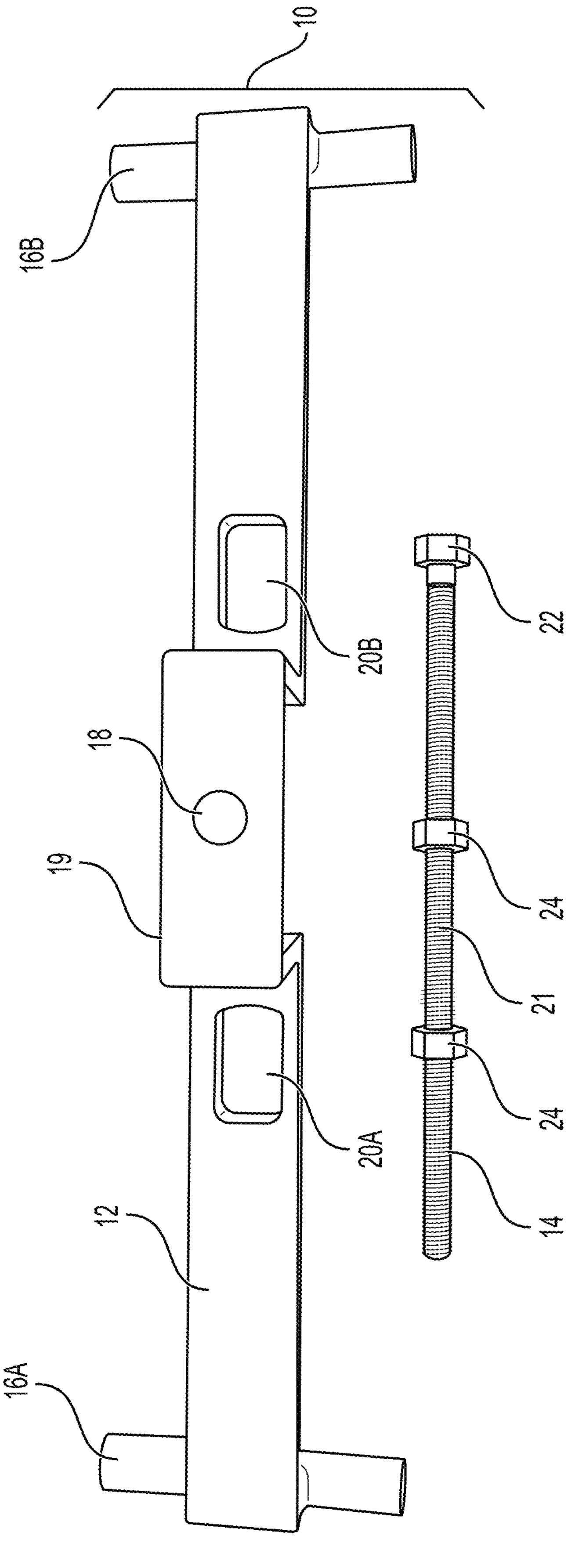
FIG. 2 is a plan view of the discharge valve removal and installation tool showing the tool stud detached from the beam.
Figure 3:
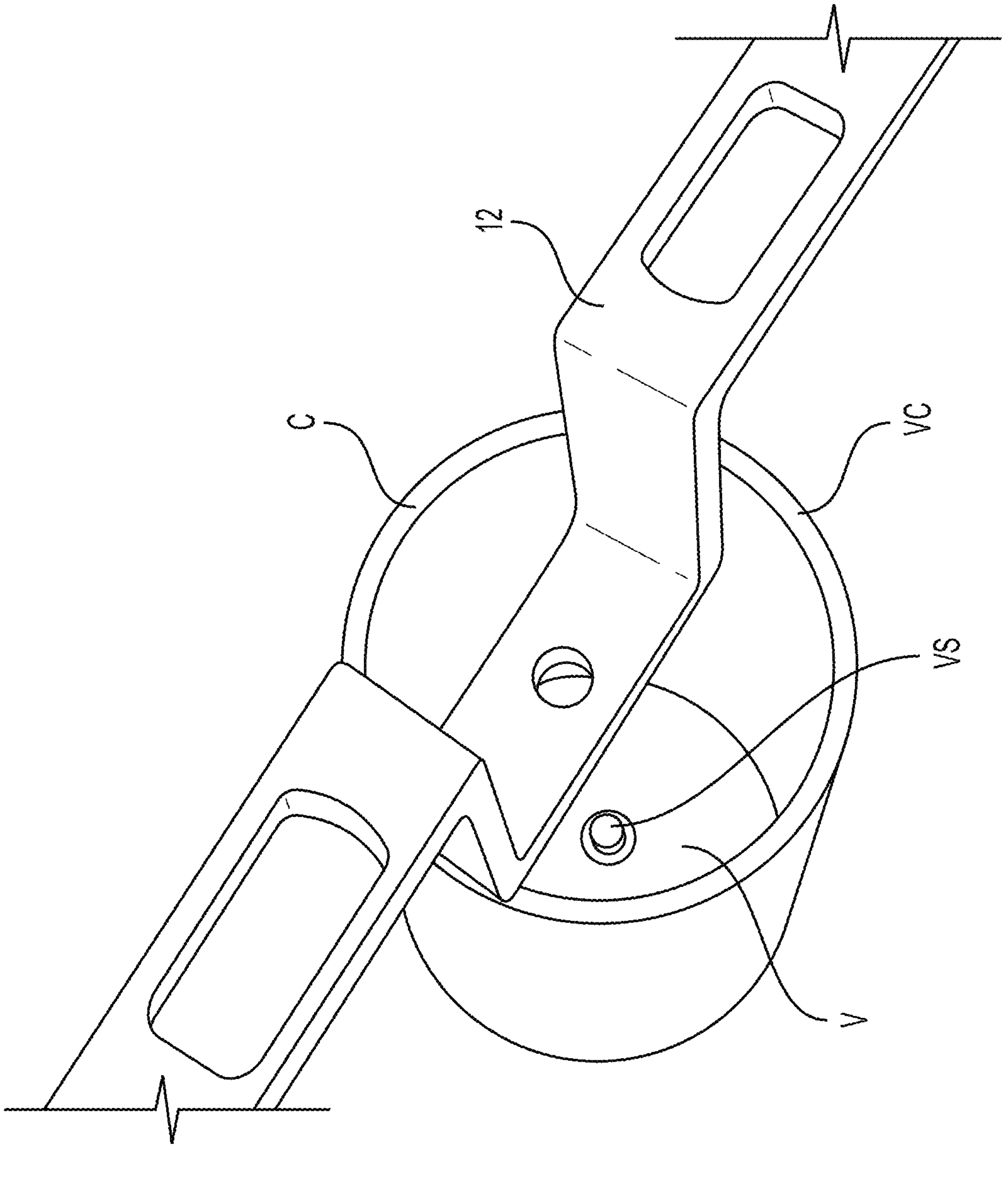
FIG. 3 is a plan view of a portion of the discharge valve removal and installation tool placed over a valve casing.
Figure 4:
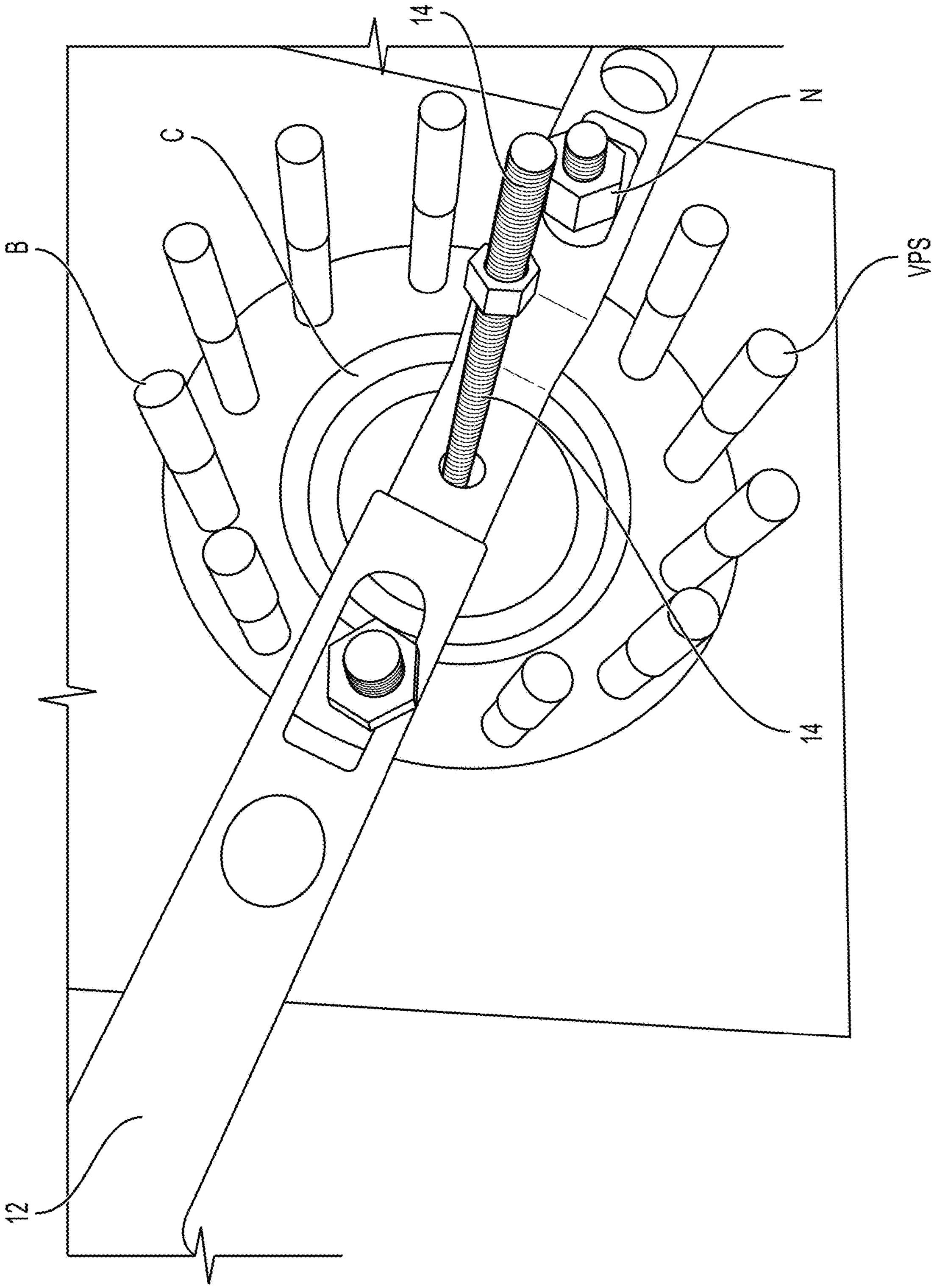
FIG. 4 is a plan view of the valve removal and installation tool secured to the cylinder valve port studs.

The following definitions are provided for the purpose of understanding the present subject matter and for construing the appended patent claims.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms “a”, “an”, and “the” include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms “include,” “includes”, “including,” “have,” “has,” or “having” should be generally understood as open-ended and non-limiting unless specifically stated otherwise.

The use of the singular herein includes the plural (and vice versa) unless specifically stated otherwise. In addition, where the use of the term “about” is before a quantitative value, the present teachings also include the specific quantitative value itself, unless specifically stated otherwise. As used herein, the term “about” refers to a ±10% variation from the nominal value unless otherwise indicated or inferred.

The term “optional” or “optionally” means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In one embodiment, the present subject matter relates to a valve assembly tool, designated 10 in the drawings, that can be used to install and remove a discharge valve of a reciprocating compressor. The valve assembly tool 10 can include a beam 12 and a tool stud 14 removably extending through the beam 12. The valve can be a bottom-loaded valve (e.g., vertically positioned).

In an embodiment, the beam 12 includes a shelf portion 15 protruding from a central portion of the beam 12, and first and second handles 16*a* and 16*b* extending from opposing ends of the beam 12. In an embodiment, the stud 14 includes an elongate threaded member 21, a locking nut 22 at an end of the stud 14 and one or more holding nuts 24, e.g., two holding nuts, spaced from the locking nut 22. In an embodiment, the shelf portion 15 includes a first upright member 17*a*, a second upright member 17*b*, and a horizontal connecting member 19 extending between and connecting the first upright member 17*a* and the second upright member 17*b*. In an embodiment, the main beam 12 includes a first opening 20*a* adjacent the first upright member 17*a* and a second opening 20*b* adjacent the second upright member 17*b*. In an embodiment, the horizontal connecting member 19 includes a central hole 18 defined therethrough. In an embodiment, the first and second handles 16*a*, 16*b* are perpendicular to the ends of the beam 12.

In one embodiment, a length of the beam 12 can be about 910 mm and a length of each handle 16 can be about 200 mm. In an embodiment, a length of the horizontal connecting member 19 of the shelf portion 15 can be about 190 mm and a height of each upright member 17*a*, 17*b* can be about 110 mm. In an embodiment, a diameter of the central hole 18 can be about 30 mm. In an embodiment, a diameter of each of the first and second openings 20*a*, 20*b* can be about 47 mm.

According to an embodiment, the valve assembly tool 10 can be detachably connected to the valve and valve cage of a reciprocating compressor for installation and removal of the valve by connecting the tool stud 14 to the valve stud VS using the locking nut 22 of the tool stud 14. According to an embodiment, the valve stud VS can threadedly engage the locking nut. The locking nut 22 can be tightened and secured to the valve stud VS by twisting the tool stud 14.

A valve assembly (valve and valve cage) can be removed from the reciprocating compressor by removing the valve cover, connecting the valve assembly tool 10 to the valve assembly by attaching the tool stud 14 to the valve stud VS using the locking nut 22 of the tool stud 14, inserting the cylinder valve port studs VPS of the reciprocating compressor into the first and second openings 20*a*, 20*b* of the valve assembly tool 10, and securing the cylinder valve port studs VPS therein using fastening nuts. The valve assembly (valve and valve cage) can be lifted or backed out of the valve port with a hand spanner. The holding nuts 24 can support the connecting member 19 and keep the valve assembly secured to the stud 14 during lifting. For removal purposes, a lifting belt (secured to an overhead crane) can be attached to both sides of the tool 10.

A valve assembly can be installed in the reciprocating compressor by removing the valve cover, connecting the valve assembly tool 10 to the valve assembly by attaching the tool stud 14 to the valve stud VS using the locking nut 22 of the tool stud 14, and moving the valve assembly tool 10 and the connected valve assembly into the seat using a hand spanner. Once the valve V is in place, the stud 14 can be detached from the valve V and the valve assembly tool 10 can be removed from the cylinder to complete the procedure.

The valve assembly tool can be used for valves of most types of gas compressors.

It is to be understood that the valve assembly tool is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A valve assembly tool, comprising:

a beam including a shelf portion protruding from a central portion of the beam and first and second handles extending from opposing ends of the beam, the shelf portion including a central hole extending therethrough, the central hole having a diameter of about 30 mm; and a tool stud extending through the central hole, the tool stud including an elongate threaded member having a locking nut at one end thereof, wherein the shelf portion includes a first upright member, a second upright member, and a connecting member, the connecting member extending between and connecting the first upright member and the second upright member, the central hole extending through the connecting member, and the tool stud extending perpendicular to the connecting member.

2. The valve assembly tool according to claim 1, wherein the tool stud further comprises first and second holding nuts spaced from the locking nut.

3. The valve assembly tool according to claim 1, wherein the beam includes a first opening adjacent the first upright member and a second opening adjacent the second upright member.

4. The valve assembly tool according to claim 3, wherein the beam includes one or more additional openings defined therethrough.

5. The valve assembly tool according to claim 1, wherein a length of the beam is about 910 mm and a length of each handle is about 200 mm.

6. The valve assembly tool according to claim 5, wherein a length of the connecting member of the shelf portion is about 190 mm and a height of each of the upright members is about 110 mm.

7. The valve assembly tool according to claim 5, wherein a diameter of each of the first and second openings is about 47 mm.

8. A valve assembly tool, comprising:

a beam including a shelf portion protruding from a central portion of the beam and first and second handles extending from opposing ends of the beam, the shelf portion including a central hole extending there-through; and a tool stud extending through the central hole, the tool stud including an elongate threaded member having a locking nut at one end thereof and first and second holding nuts spaced from the locking nut, wherein the shelf portion includes a first upright member, a second upright member, and a connecting member, the connecting member extending between and connecting the first upright member and the second upright member, the central hole extending through the connecting member, and the tool stud extending perpendicular to the connecting member.

9. The valve assembly tool according to claim 8, wherein the beam includes a first opening adjacent the first upright member and a second opening adjacent the second upright member.

10. The valve assembly tool according to claim 9, wherein the beam includes one or more additional openings defined therethrough.

11. The valve assembly tool according to claim 9, wherein a length of the beam is about 910 mm and a length of each handle is about 200 mm.

12. The valve assembly tool according to claim 9, wherein a length of the connecting member of the shelf portion is about 190 mm and a height of each of the upright members is about 110 mm.

13. The valve assembly tool according to claim 9, wherein a diameter of the central hole is about 30 mm.

14. The valve assembly tool according to claim 9, wherein a diameter of each of the first and second openings is about 47 mm.

15. A valve assembly tool, comprising:

a beam including a shelf portion protruding from a central portion of the beam and first and second handles extending from opposing ends of the beam, the shelf portion including a first upright member, a second upright member, a connecting member extending between and connecting the first upright member and the second upright member, and a central hole extending through the connecting member; and a tool stud extending through the central hole, the tool stud including an elongate threaded member having a locking nut at one end thereof and first and second holding nuts spaced from the locking nut;

and the tool stud extending perpendicular to the connecting member.

16. The valve assembly tool according to claim 15, wherein the beam includes a first opening adjacent the first upright member and a second opening adjacent the second upright member.

17. The valve assembly tool according to claim 16, wherein the beam includes one or more additional openings defined therethrough.

* * * * *